United States Patent [19]

Hasegawa

[11] Patent Number: 4,509,843
[45] Date of Patent: Apr. 9, 1985

[54] APPARATUS FOR CONTROLLING A MICRO-PROCESSOR UNIT IN A CAMERA

[75] Inventor: Hiroshi Hasegawa, Tokyo, Japan

[73] Assignee: Nippon Kogaku K.K., Tokyo, Japan

[21] Appl. No.: 356,407

[22] Filed: Mar. 9, 1982

[30] Foreign Application Priority Data

Mar. 12, 1981 [JP] Japan ................................ 56-35912

[51] Int. Cl.³ .............................................. G03B 7/00
[52] U.S. Cl. .................................. 354/412; 354/441; 354/458
[58] Field of Search ...................... 354/412, 441, 458

[56] References Cited

U.S. PATENT DOCUMENTS 4,361,387  11/1982  Cloutier .............................. 354/412

Primary Examiner—Russell E. Adams
Attorney, Agent, or Firm—Shapiro and Shapiro

[57] ABSTRACT

Apparatus for controlling a micro-processor unit in which a set signal is supplied to a micro-processor unit to change its state from a first state to a second state in response to a shutter releasing operation. The voltage of a power source is detected by a detection circuit that produces an output in response to a voltage change from a level lower than a predetermined value to a higher level. A reset signal changes the state of the micro-processor unit from the second state to the first state in response to the output from the detection circuit.

8 Claims, 38 Drawing Figures

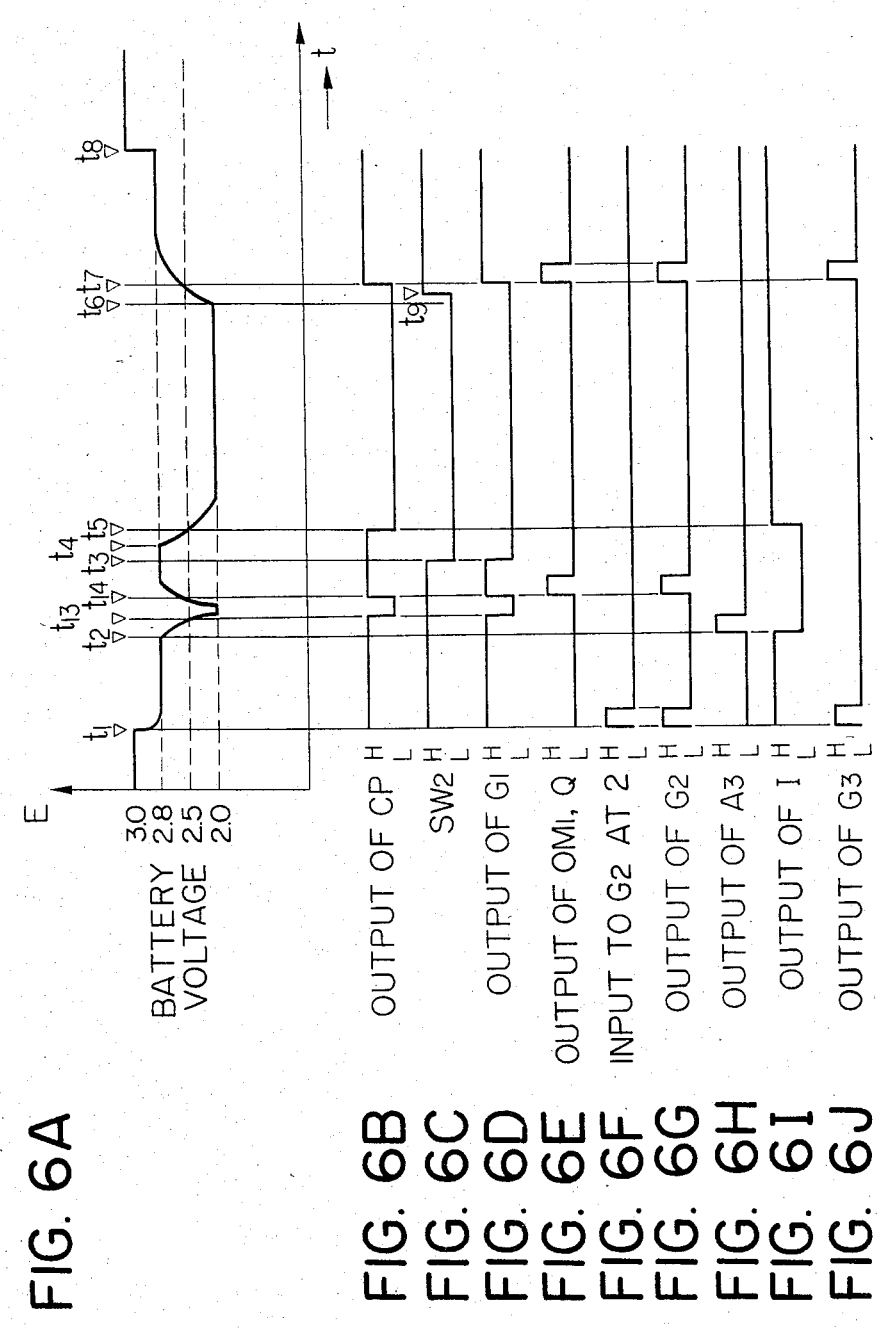

APPARATUS FOR CONTROLLING A MICRO-PROCESSOR UNIT IN A CAMERA

BACKGROUND OF THE INVENTION

1. Field of the Invention

The present invention relates to such cameras in which an M.P.U. (Micro Processor Unit) is used.

2. Description of the Prior Art

As the electric power source of an automatic exposure control camera (AE camera) there is generally used a battery in the order of 3 V. At present, a microprocessor unit (hereinafter referred to as MPU by its abbreviation) is sometimes used in such camera to control various photographing operations of the camera such as an exposure controlling operation. For an MPU used in a camera, it is very difficult to reduce its operating voltage to a level lower than 2.5 V because of the technical limitation on the manufacture of an IC (integrated circuit). The minimum value of operating voltage of an MPU now available is usually about 2.5 V. In case of the above mentioned cameras such as AE cameras, a large amount of electric power is consumed during the supply of current to the shutter controlling magnet. Therefore, if the battery is in the state of increased internal resistance (at the time of low temperature or at the time close to the end of the battery life), then the battery voltage drops sometimes under 2.5 V during the supply of current to the shutter controlling magnet. In contrast, a small amount of electric current is consumed in the camera during a photometering arithmetic operation and therefore during this time there never occurs a drop of the battery voltage under 2.5 V. For this reason, cameras using an MPU have been designed in such manner that the arithmetic operations necessary for exposure control are all finished during the time of photometering and the operation of the MPU is stopped after releasing the shutter of the camera. After releasing the shutter, the MPU in the camera is kept in a state in which the MPU can not operate and only the internal resulting from arithmetic operations can remain stored therein. In this state, the MPU can keep the internal data in memory even when the source voltage drops to about 1.5 V and therefore the exposure control can be performed without any problem. However, in order to restore the MPU to its normal state for operation, it is required to externally reset the MPU. Timing of this external resetting is of critical importance. If MPU is reset under the condition in which the source voltage is still below 2.5 V, then the MPU can not be returned to its normal state for operation. In this case, there may occur unexpected troubles such as runaway of the program. Hitherto, this matter has not been fully considered in designing the above mentioned type of camera. None of the known apparatus includes effective means to solve the problem. As a result, known cameras of the above type sometimes have malfunctions.

SUMMARY OF THE INVENTION

Accordingly, it is a general object of the present invention to solve the above mentioned problem.

It is a more specific object of the invention to provide a camera having a built in the MPU in which MPU is reset to its normal state for operation at a time point optimum for operation of the camera.

Other and further objects, features and advantages of the invention will appear more fully from the following description taken in connection with the accompanying drawings.

BRIEF DESCRIPTION OF THE DRAWINGS

FIGS. 6A-6J are timing charts of the second embodiment.

DETAILED DESCRIPTION OF PREFERRED EMBODIMENTS

Figure 1:
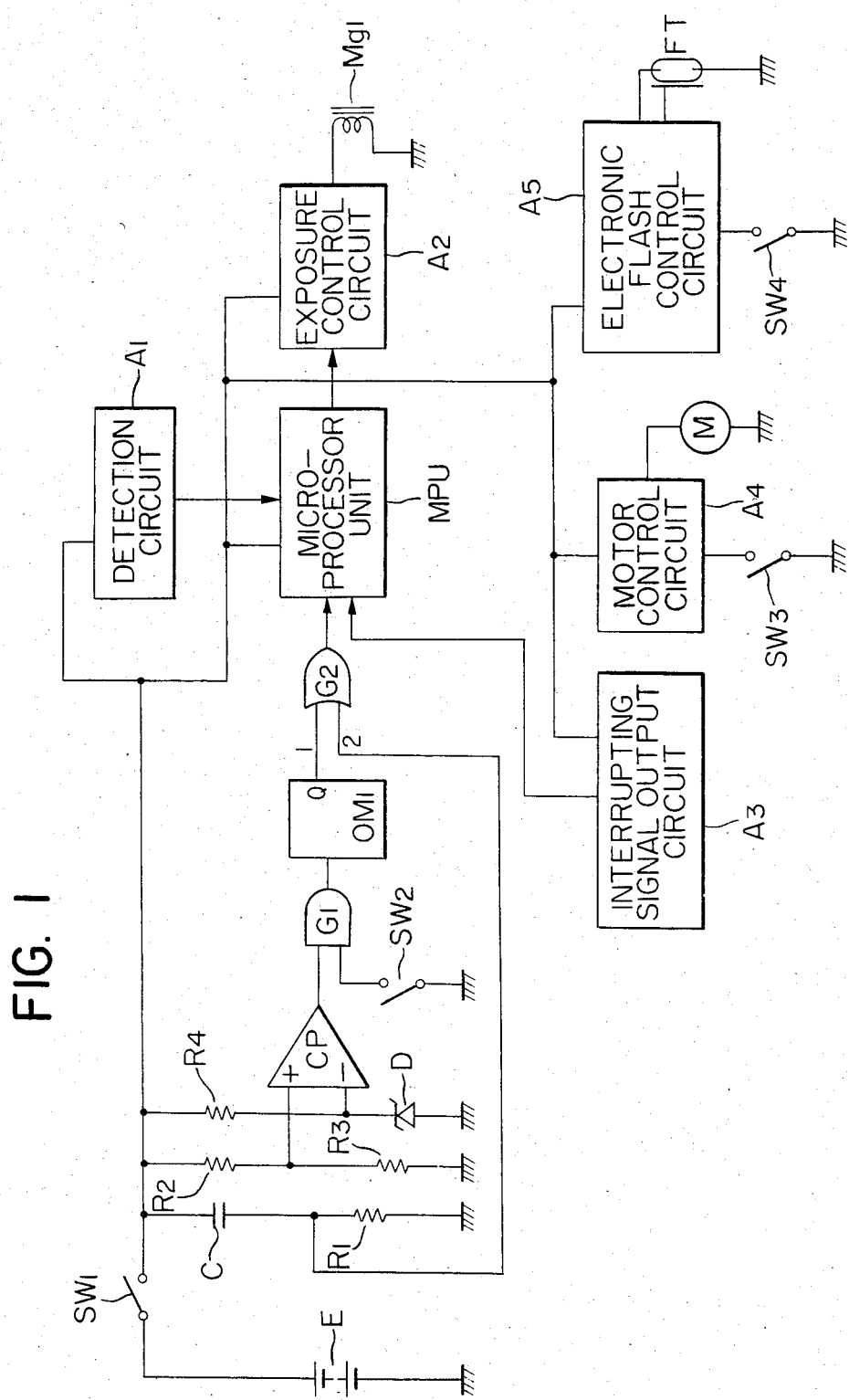
FIG. 1 is a circuit diagram showing a first embodiment of the invention.

Referring first to FIG. 1 showing a first embodiment of the invention, E is a power source battery and $SW_1$ is a power source switch. A capacitor C and a resistor $R_1$ constitute a differentiation circuit for generating differential pulses when the power source is switched in. $R_2$ and $R_3$ are voltage dividing resistors for detecting the battery voltage. A resistor $R_4$ and a Zener diode D are connected in series to the power source E so as to generate a reference voltage. CP is a comparator for voltage detection and $G_1$ is an AND gate. $SW_2$ is a mirror switch which is turned ON in link with the upward movement of a mirror and turned OFF with the downward movement of the mirror. OM1 is a one shot multivibrator, $G_2$ is an OR gate and MPU is a microprocessor unit. $A_1$ is a detection circuit for detecting the photometric output, exposure factors, etc. and introducing the detected data into the micro-processor unit MPU. $A_2$ is an exposure control circuit for controlling the diaphragm aperture value and/or the shutter time in seconds.

Although not shown, the shutter of the camera used in the embodiment is a focal plane shutter whose first blind is mechanically driven and whose second blind is driven by means of a shutter controlling magnet Mg1. MPU is set to a state for memory input by means of an interrupting signal generated from an interrupting signal output circuit $A_3$. In the state for memory input, the arithmetic operation of MPU is stopped and the result of the arithmetic operation is stored in memory in MPU.

M is a film winding motor which is controlled by a motor control circuit $A_4$. $SW_3$ is a switch for actuating the motor M. $A_5$ is an electronic flash unit including a flash tube FT. $SW_4$ is a synchro-contact.

Figure 2:
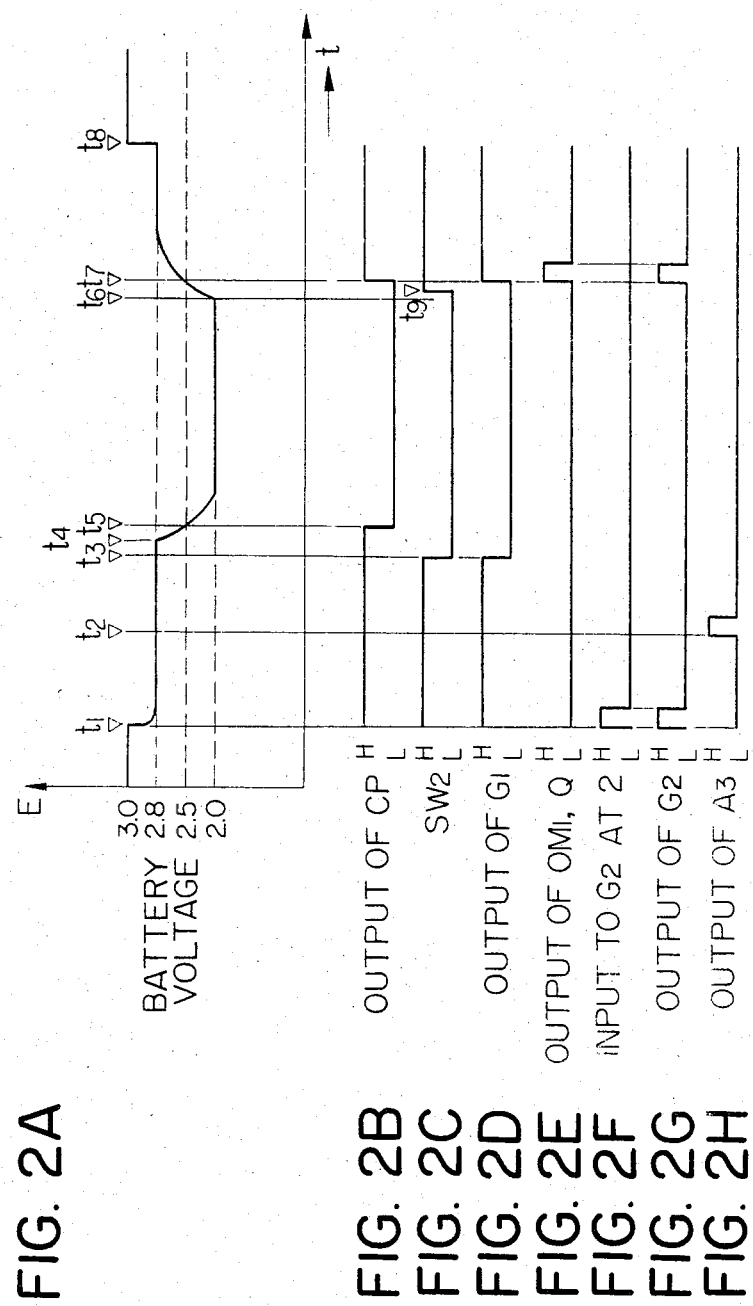
FIGS. 2A-2H are timing charts of the first embodiment.

FIG. 2 is a timing chart of the above first embodiment as obtained when the motor M, motor control circuit $A_4$, electronic flash control circuit $A_5$, the switch $SW_3$, synchro-contact $SW_4$ and flash tube FT are not driven.

The manner of operation of the first embodiment will be described as first with reference to FIG. 2.

When the operator turns the power source switch $SW_1$ on at the time point $t_1$ shown in FIG. 2, the battery voltage drops down to about 2.8 V from its normal voltage 3.0 V. The comparator CP is so designed that its output is at high level (H) while the battery voltage is higher than 2.5 V. Therefore, on the turn-ON of the power source switch $SW_1$, the output of the comparator CP becomes "H". Since the input 2 to OR gate $G_2$ is "H" for a predetermined time through the differentiation circuit C, $R_1$, the output from the gate $G_2$ also becomes "H" for the predetermined time. The mirror switch $SW_2$ remains OFF because any shutter releasing operation has not been done yet. Consequently, the output of AND gate $G_1$ is also "H". The one shot multivibrator OM1 is so designed as to generate positive pulses at its Q output for a predetermined time length only when the input to it changes from low level "L" to "H". Therefore, the Q output remains "L" at this time point.

At the time point $t_2$ shown in FIG. 2, the camera shutter is released. In response to it, the interrupting signal output circuit $A_3$ generates an interrupting signal which is applied to MPU. Receiving the signal, MPU stops arithmetic operation and keeps the result of the arithmetic operation in memory. At $t_3$, the mirror starts moving and therefore the mirror switch $SW_2$ is turned ON. Also, the output from AND gate $G_1$ becomes "L". At $t_4$, the shutter controlling magnet Mg1 turns ON whereby the current consumed in the circuit increases and therefore the battery voltage drops gradually. At the time point $t_5$ the battery voltage becomes lower than 2.5 V and then the output of the comparator CP is turned to "L" from "H". The battery voltage continues dropping up to the level of about 2.0 V. At $t_6$ when a determined exposure time has passed, the supply current to the shutter controlling magnet Mg1 is cut OFF. Therefore, from this time point $t_6$ the battery voltage gradually increases. However, in the camera, the second blind starts running and at $t_9$ the mirror begins moving downwards. By this downward movement of the mirror, the mirror switch $SW_2$ is switched over from ON to OFF.

The battery voltage continues to increase further and at the same point of $t_7$ it becomes higher than 2.5 V. Therefore, the output of the comparator CP is turned to "H" from "L" and the output of AND gate $G_1$ is also turned to "H" from "L". At this time, the one shot multivibrator OM1 generates a pulse having a definite time duration. This pulse is applied to MPU through OR gate $G_2$ as a reset pulse to restore the MPU to its normal state for operation. At $t_8$ the power source switch $SW_1$ is turned OFF.

Figure 3:
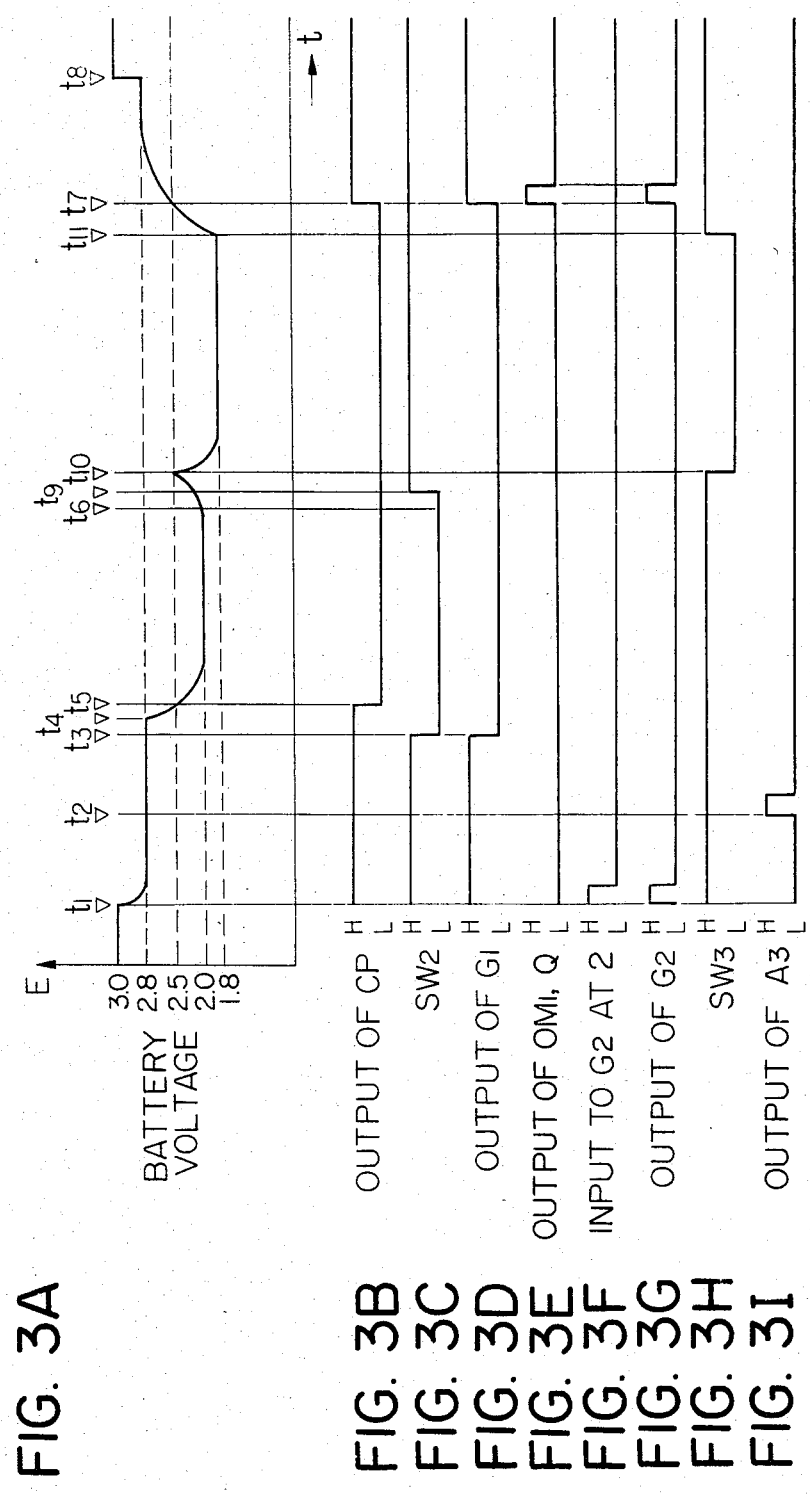
FIGS. 3A-3I are timing charts of the first embodiment.

FIG. 3 is a timing chart of the first embodiment as obtained when the electronic flash control circuit $A_5$, flash tube FT and synchro-contact $SW_4$ are not driven.

Timings of $t_1$-$t_8$ are entirely the same as those described above with reference to FIG. 2 and need not be further described.

At $t_6$ the supply current to the magnet Mg1 is cut OFF and therefore the battery voltage begins increasing gradually, which is the same as in the above case. However, in the case shown in FIG. 3, at the same point $t_{10}$ the supply of current to the film winding motor M is started. Therefore the battery voltage is again decreased. At $t_{11}$, the film winding is completed and the supply current to the motor M is cut OFF. Consequently, the battery voltage again increases gradually. At $t_7$ the output of the comparator CP is inverted and a reset pulse is applied to MPU to restore it to the normal state for operation.

Figure 4:
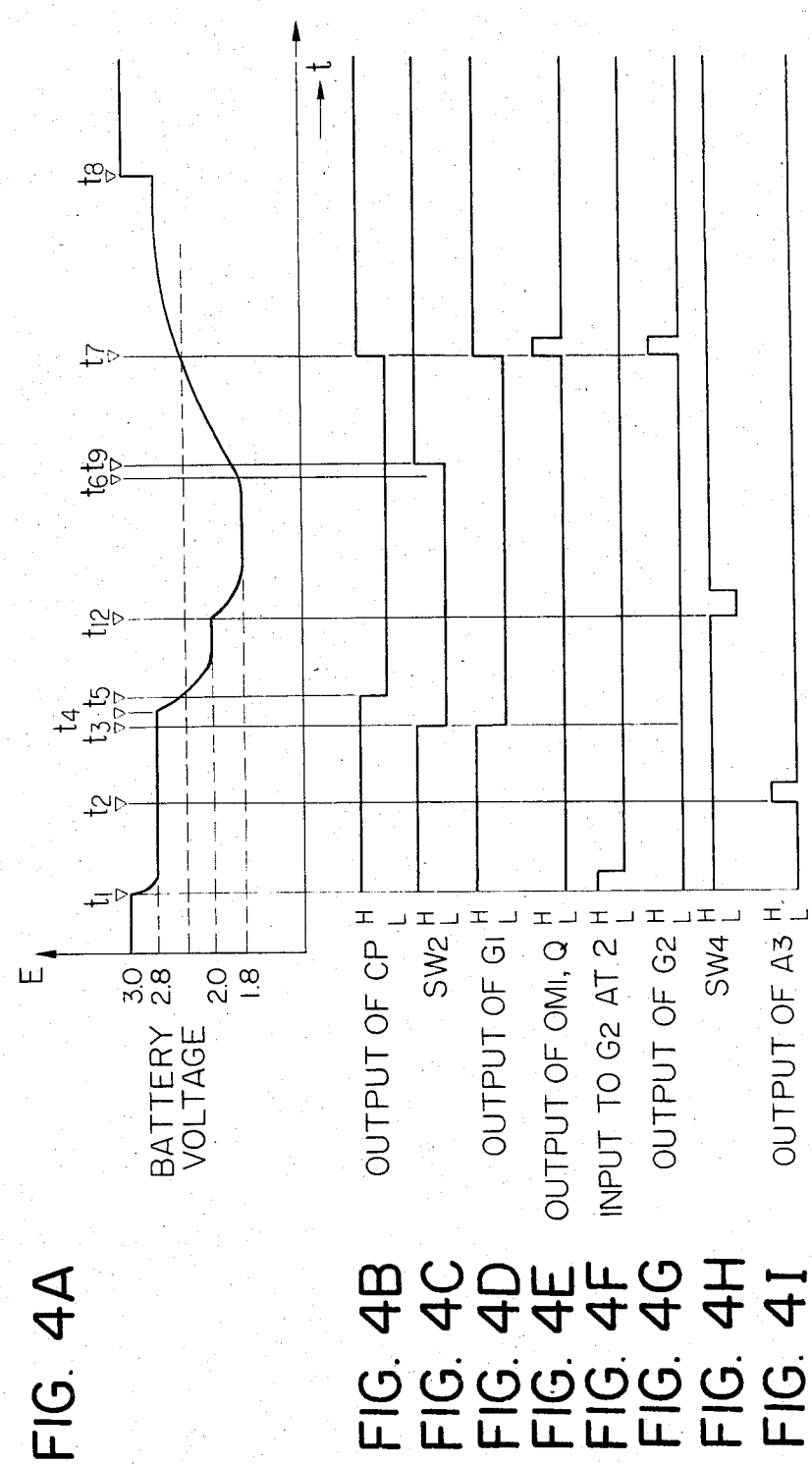
FIGS. 4A-4I are timing charts of the first embodiment.

FIG. 4 is another timing chart of the first embodiment as obtained when the motor M, switch $SW_3$ and motor control circuit $A_4$ are not driven. Timings of $t_1$-$t_8$ are entirely the same as those described above with reference to FIG. 2 and need not be further described.

At $t_2$ the camera shutter is released. When the shutter blade is fully opened ($t_{12}$), the synchro-contact $SW_4$ is turned ON to make the electronic flash unit $A_5$ start flashing. To a main capacitor not shown mounted in the flash unit $A_5$ a large charge current flows at this time. Because of this large charge current flowing from the battery E to the flash unit $A_5$, the voltage of the battery E drops further. With increasing charge on the main capacitor in the electronic flash unit $A_5$, the voltage of the battery E rises gradually. At $t_7$ the output of the comparator CP is inverted whereby a reset pulse is applied to MPU. Then, MPU returns to its normal operation state.

Figure 5:
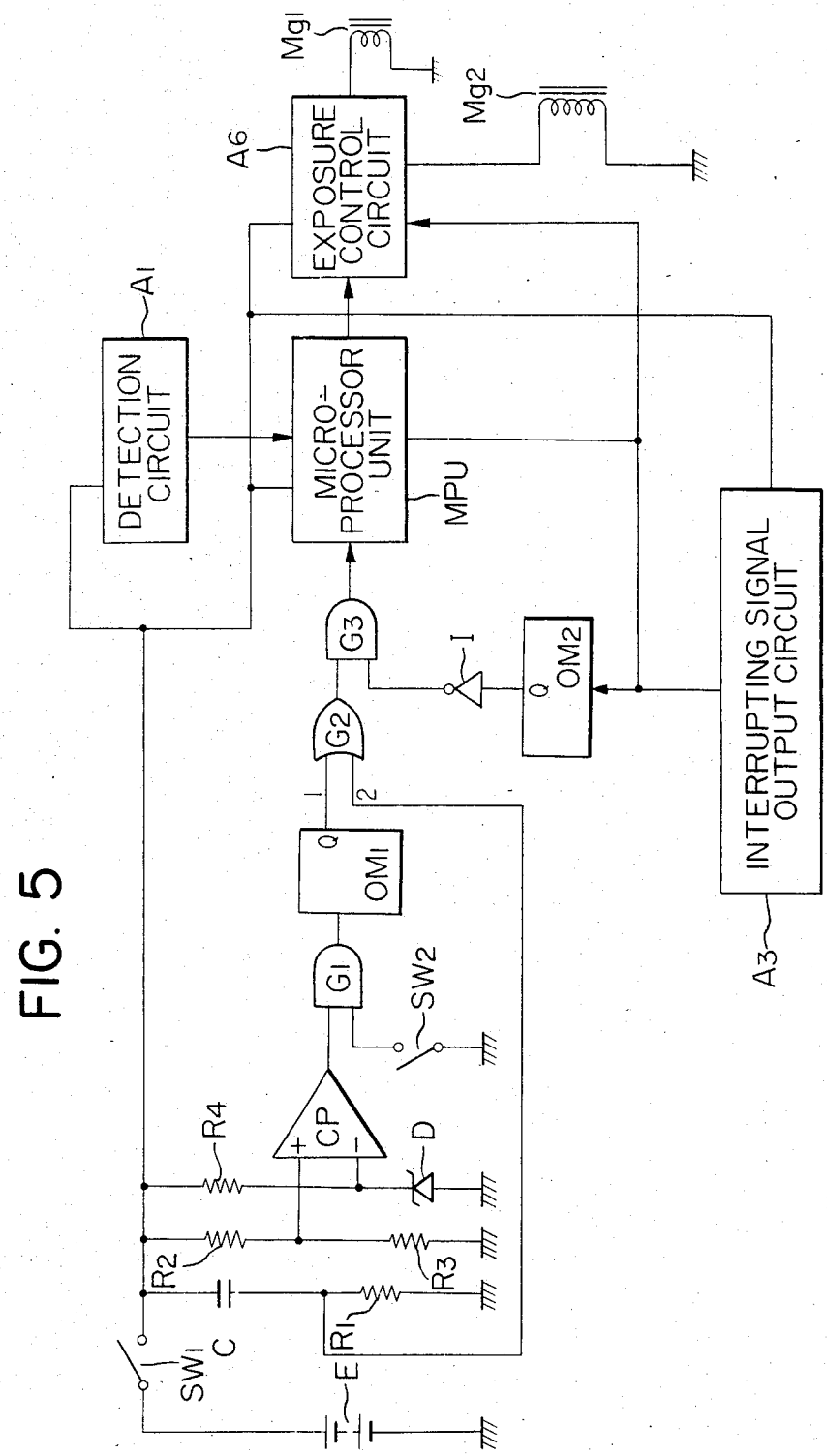
FIG. 5 is a circuit diagram showing a second embodiment of the invention.

FIG. 5 shows a second embodiment of the invention. In this embodiment there is employed an electromagnetic release. As the interrupting signal output circuit $A_3$ there is used a circuit which supplies an interrupting signal not only to the micro-processor unit MPU but also to the one shot multivibrator OM2 and exposure control circuit $A_6$.

AND gate $G_3$ applies to MPU a logical product of the output of OR gate $G_2$ and the output of the one shot multivibrator OM2 through an inverter I. Mg1 is a magnet for controlling the shutter and Mg2 is a magnet for electromagnetic release whose function is to initiate the releasing operation of the shutter mechanism. Both of the magnets Mg1 and Mg2 are controlled by an exposure control circuit $A_6$.

FIG. 6 is a timing chart of the second embodiment.

The manner of operation of the second embodiment is as follows.

Timings of $t_1$, $t_3$ and $t_6$-$t_9$ are entirely the same as in the above first embodiment. At $t_2$ the shutter is released. In response to it, an interrupting signal is applied to the one shot multivibrator OM2, the micro-processor unit MPU and the exposure control circuit $A_6$ from the interrupting signal output circuit $A_3$. By means of the interrupting signal, the magnet for electromagnetic release Mg2 is turned ON. Therefore, the current consumed in the circuit increases and the voltage of the battery E decreases accordingly. At $t_{13}$ the battery voltage becomes lower than 2.5 V. Also, by means of the interrupting signal issued at $t_2$, the output of the one shot multivibrator OM2 is turned to "H" and continues to be "H" during the time of from $t_2$ to $t_5$. Therefore, during the same time period of $t_2$ to $t_5$, the output from the inverter I is "L". At $t_{13}$ the output of the comparator CP is turned from "H" to "L" and also the output of AND gate $G_1$ is turned from "H" to "L". On the completion of the releasing operation, the supply current to the magnet Mg2 is cut OFF and the voltage of the battery begins increasing. At $t_{14}$ the battery voltage becomes higher than 2.5 V and therefore the output of the comparator CP turns to "H" from "L". At the same time, the output of AND gate $G_1$ turns to "H" from "L" and then the one shot multivibrator OM1 supplies a pulse with a definite time duration to AND gate $G_3$ through OR gate $G_2$. However, as the output of the inverter I continues to be "L" during the time of from $t_2$ to $t_5$, the output of AND gate $G_3$ remains "L". In this manner, also in case of electromagnetic release, a reset pulse can be applied to MPU at a most appropriate time point.

While the present invention has been particularly shown and described with reference to preferred embodiments thereof, it will be understood by those skilled in the art that various modifications may be made therein without departing from the spirit and scope of the invention.

I claim:

1. In a camera of the type which includes a micro-processor unit operable in a first state where it can operate to carry out an arithmetic operation of data relating to an exposure to be controlled according to exposure factors and store said data in memory, and in a second state where it can hold said memorized data; an exposure control means for controlling a diaphragm device and/or a shutter device by an electromagnetic device according to said memorized data when a shutter releasing operation is conducted; and an electric power source for supplying a voltage to said micro-processor unit, exposure control means and electromagnetic device, and in which said micro-processor unit is operable in said first state when the source voltage applied to it is at least as high as a predetermined voltage level and said micro-processor unit is operable only in said second state when the source voltage applied to it is lower than said predetermined level, apparatus for controlling said micro-processor unit comprising:

means responsive to initiation of said shutter releasing operation for supplying a set signal to said micro-processor unit that causes said micro-processor unit to change from said first state to said second state;

detection means for detecting the voltage of said power source and generating an output in response to a change of the voltage from a level lower than said predetermined value to a level as high as said predetermined value; and resetting means for supplying a reset signal to said micro-processor unit that causes said micro-processor unit to change from said second state to said first state in response to the output from said detection means.

2. Apparatus for controlling a micro-processor unit in a camera as set forth in claim 1, which further comprises means for inhibiting the input of the reset signal to said micro-processor unit in response to said set signal during the time from shutter releasing point to shutter closing point.

3. Apparatus for controlling a micro-processor unit in a camera as set forth in claim 1, which further comprises another resetting means for producing a reset signal that bring said micro-processor unit into said first state in response to the application of the source voltage to said micro-processor unit and said exposure control means.

4. Apparatus for controlling a micro-processor unit in a camara as set forth in claim 1, wherein said resetting means includes another resetting means for supplying a reset signal to said micro-processor unit in response to the completion of driving said shutter device when said source voltage is at least as high as the predetermined voltage level.

5. In a camera of the type which includes a micro-processor unit operable in a first state where it can operate to carry out an arithmetic operation of data relating to an exposure to be controlled according to exposure factors and store said data in memory, and in a second state where it can hold said memorized data;

exposure control means having an electromagnetic device for driving a diaphragm device and/or a shutter device in response to the supply of current to said electromagnetic device to effect an exposure operation;

and an electric power source for supplying power to said micro-processor unit, said exposure control means and said electromagnetic device, apparatus for controlling said micro-processor unit comprising:

(a) means responsive to initiation of an exposure operation for supplying a set signal to said micro-processor unit that causes said micro-processor unit to change from said first state to said second state prior to the supply of current to said electromagnetic device;

(b) detection means for detecting the voltage applied to said micro-processor unit and generating an output in response to a change of the detected voltage from a level lower than a predetermined value to a level as high as said predetermined value; and (c) resetting means for supplying a reset signal to said micro-processor unit that causes said micro-processor unit to change from said second state to said first state in response to the output from said detection means.

6. Apparatus for controlling a micro-processor unit in a camera as set forth in claim 5, which further comprises means for inhibiting the input of the reset signal into said micro-processor unit in response to said set signal during a predetermined interval.

7. Apparatus for controlling a micro-processor unit in a camera as set forth in claim 5, which further comprises another resetting means for supplying a reset signal that brings said micro-processor unit into said first state in response to the application of the source voltage of said micro-processor unit and said exposure control means.

8. Apparatus for controlling a micro-processor unit in a camera as set forth in claim 5, wherein said resetting means includes another resetting means for supplying a reset signal to said micro-processor unit in response to the completion of driving said shutter device when said source voltage is at least as high as the predetermined voltage level.

* * * * *